United States Patent
Nakazawa et al.

(10) Patent No.: US 12,208,374 B2
(45) Date of Patent: Jan. 28, 2025

(54) CATALYST COMPOSITION AND CARBON MATERIAL HAVING NITROGEN-CONTAINING GROUP

(71) Applicants: NISSAN CHEMICAL CORPORATION, Tokyo (JP); NATIONAL UNIVERSITY CORPORATION OITA UNIVERSITY, Oita (JP)

(72) Inventors: Taichi Nakazawa, Funabashi (JP); Taro Kinumoto, Oita (JP)

(73) Assignees: NISSAN CHEMICAL CORPORATION, Tokyo (JP); NATIONAL UNIVERSITY CORPORATION OITA UNIVERSITY, Oita (JP)

( * ) Notice: Subject to any disclaimer, the term of this patent is extended or adjusted under 35 U.S.C. 154(b) by 179 days.

(21) Appl. No.: 17/909,084

(22) PCT Filed: Mar. 5, 2021

(86) PCT No.: PCT/JP2021/008591
§ 371 (c)(1),
(2) Date: Sep. 2, 2022

(87) PCT Pub. No.: WO2021/177431
PCT Pub. Date: Sep. 10, 2021

(65) Prior Publication Data
US 2023/0096685 A1    Mar. 30, 2023

(30) Foreign Application Priority Data

Mar. 6, 2020    (JP) ................. 2020-038562

(51) Int. Cl.
*B01J 27/24*    (2006.01)
*B01J 23/00*    (2006.01)
(Continued)

(52) U.S. Cl.
CPC ............... *B01J 27/24* (2013.01); *B01J 23/00* (2013.01); *B01J 27/02* (2013.01); *B01J 31/18* (2013.01)

(58) Field of Classification Search
CPC ... B01J 23/00; B01J 27/02; B01J 27/24; B01J 31/18; C01B 32/00; Y02E 60/50
See application file for complete search history.

(56) References Cited

U.S. PATENT DOCUMENTS

2013/0280639 A1\* 10/2013 Imai ................ H01M 4/8652
502/1
2017/0197978 A1\* 7/2017 Deng .................. A61P 37/06

FOREIGN PATENT DOCUMENTS

| JP | 2010-195987 A | 9/2010 |
| JP | 2013-112591 A | 6/2013 |

(Continued)

OTHER PUBLICATIONS

Machine Translation of KR 20150141397. (Year: 2015).\*
(Continued)

*Primary Examiner* — Brian A McCaig
(74) *Attorney, Agent, or Firm* — Birch, Stewart, Kolasch & Birch, LLP

(57) ABSTRACT

When a metal catalyst is used as a catalyst in a catalyst layer of a polymer electrolyte fuel cell, improvement in catalytic activity and improvement in durability of the metal catalyst are intended. The catalyst composition of the present invention comprises a metal catalyst, a carbon material having a nitrogen-containing group on which the metal catalyst is carried, and an ionomer.

10 Claims, 1 Drawing Sheet

(51) Int. Cl.
*B01J 27/02* (2006.01)
*B01J 31/18* (2006.01)

(56) References Cited

FOREIGN PATENT DOCUMENTS

| | | | | |
|---|---|---|---|---|
| JP | 2016-135471 A | 7/2016 | | |
| JP | 2019-202287 A | 11/2019 | | |
| KR | 20150141397 | * 12/2015 | ............ | B01J 23/755 |
| WO | WO 2019/221156 A1 | 11/2019 | | |

OTHER PUBLICATIONS

International Search Report, issued in PCT/JP2021/008591, PCT/ISA/210, dated May 18, 2021.
Orfanidi et al., "The Key to High Performance Low Pt Loaded Electrodes", Journal of The Electrochemical Society, 2017, vol. 164, No. 4, pp. F418-F426.
Written Opinion of the International Searching Authority, issued in PCT/JP2021/008591, PCT/ISA/237, dated May 18, 2021.

* cited by examiner

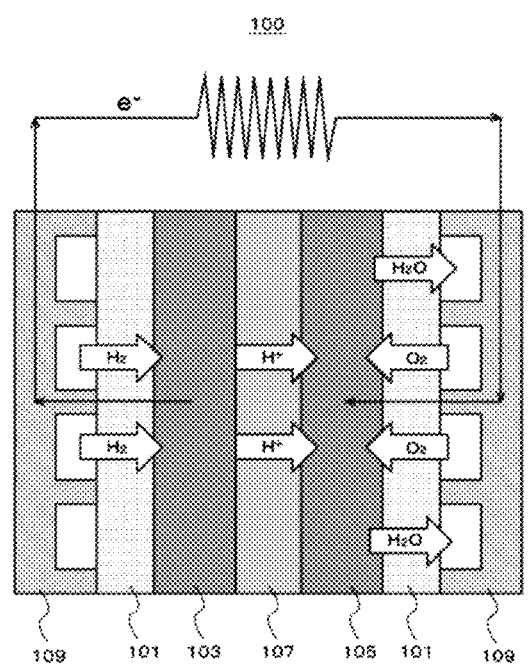

CATALYST COMPOSITION AND CARBON MATERIAL HAVING NITROGEN-CONTAINING GROUP

TECHNICAL FIELD

The present invention relates to a novel catalyst composition and catalyst carrier suitably used for a polymer electrolyte fuel cell catalyst layer.

BACKGROUND ART

A polymer electrolyte fuel cell (hereinafter, also referred to as a "fuel cell") is to convert energy generated by a chemical reaction into electrical energy.

The fuel cell has a membrane electrode assembly (Membrane Electrode Assembly), the membrane electrode assembly has an anode catalyst layer, a cathode catalyst layer and a polymer electrolyte membrane sandwiched by both catalyst layers, and each catalyst layer has a gas diffusion layer (Gas Diffusion Layer) at the outside thereof. This catalyst layer contains a catalyst carried on a catalyst carrier and an electrolyte.

As the catalyst carrier, a carbon material such as carbon black has been generally used from the viewpoints of electronic conductive properties and durability. As the catalyst, a metal catalyst such as platinum having high catalytic activity has been generally used. As the electrolyte, an ionomer has been generally used.

This ionomer as an electrolyte is required to conduct a proton to a catalyst, so that it has a sulfonic acid group. And, it has been desired to uniformly cover the catalyst surface in order to conduct the proton to the catalyst without deviation.

In Non-Patent Document 1, it has been reported that by introducing an amino group into carbon black as a catalyst carrier and by forming an ion pair between the amino group and the sulfonic acid group possessed by the ionomer, the ionomer can cover a catalyst carrier on which a catalyst is carried without deviation.

On the other hand, in Patent Document 1, as a method of introducing an amino group into a carbon material with a simple and easy operation, it has been reported a method in which flaked graphite and an azo-based radical initiator having an amino group are heated and stirred in a solvent.

PRIOR ART DOCUMENTS

Patent Document

Patent Document 1: JP 2013-112591A

Non-Patent Document

Non-Patent Document 1: J. Electrochem. Soc., 164, F418-F426 (2017)

SUMMARY OF THE INVENTION

Problems to be Solved by the Invention

Since a metal catalyst uses a metal with a high price in many cases, it is required to exhibit high catalytic activity with a smaller amount. In addition, it is required to be able to be used for a long period of time.

An object of the present invention is to improve catalytic activity and durability of the catalyst when a metal catalyst is used as a catalyst in the catalyst layer of a polymer electrolyte fuel cell.

Means to Solve the Problems

[1] A catalyst composition which comprises a metal catalyst, a carbon material having a nitrogen-containing group on which the metal catalyst is carried, and an ionomer.

[2] The catalyst composition of [1], wherein the nitrogen-containing group contains at least one kind selected from the group consisting of an imidazoline structure, an amidine structure, an amide bond and a cyano group.

[3] The catalyst composition described in [1] or [2], wherein the nitrogen-containing group is at least one kind selected from the following groups.

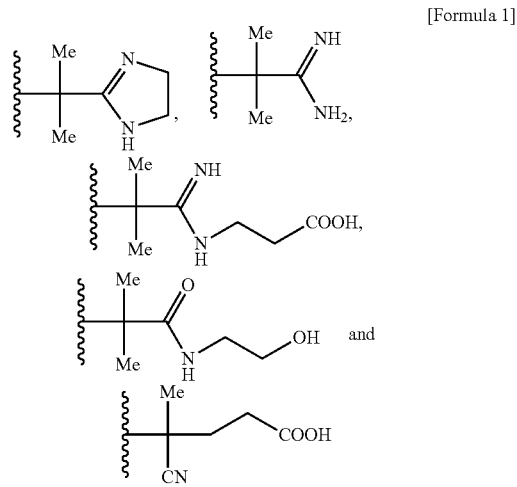

[Formula 1]

[4] The catalyst composition of any of [1] to [3], wherein the carbon material is at least one kind selected from the group consisting of carbon black, graphitized carbon black, natural graphite, artificial graphite, single layer graphene, multilayer graphene, single-walled carbon nanotube, multi-walled carbon nanotube, fullerene, diamond-like carbon, activated carbon, coke and carbon fiber.

[5] The catalyst composition of any of [1] to [4], wherein the ionomer has a sulfonic acid group.

[6] The catalyst composition of any of [1] to [5], wherein the carbon material having a nitrogen-containing group is obtained by reacting the carbon material and an azo compound having a nitrogen-containing group.

[7] The catalyst composition of any of [1] to [6], which is used for a catalyst layer of a polymer electrolyte fuel cell.

[8] A catalyst layer for a polymer electrolyte fuel cell which comprises the catalyst composition of any of [1] to [6].

[9] A membrane electrode assembly, which comprises a polymer electrolyte membrane, a gas diffusion layer and the catalyst layer for a polymer electrolyte fuel cell of [8].

[10] A polymer electrolyte fuel cell having a membrane electrode assembly of [9].

[11] A carbon material having a nitrogen-containing group, wherein the nitrogen-containing group is at least one kind selected from the following groups.

[Formula 2]

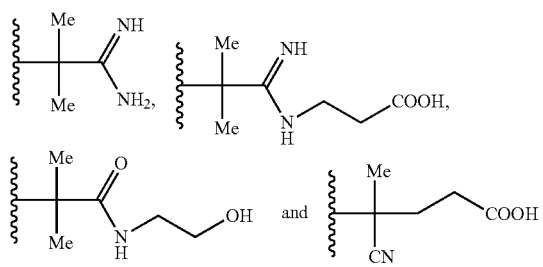

Effects of the Invention

In the catalyst layer for a polymer electrolyte fuel cell using the catalyst composition of the present invention, catalytic activity of the metal catalyst is improved and durability of the metal catalyst is improved.

BRIEF DESCRIPTION OF THE DRAWING

FIG. 1 is a sectional view schematically showing the structure of the polymer electrolyte fuel cell.

EMBODIMENTS TO CARRY OUT THE INVENTION

First Embodiment of the Present Invention

The first embodiment of the present invention is a catalyst composition which comprises a metal catalyst, a carbon material having a nitrogen-containing group on which the metal catalyst is carried, and an ionomer. The catalyst composition of the first embodiment can be suitably used for a catalyst layer of a polymer electrolyte fuel cell.
<Polymer Electrolyte Fuel Cell>
FIG. 1 is a sectional view schematically showing the structure of a polymer electrolyte fuel cell. The polymer electrolyte fuel cell 100 has an anode catalyst layer 103, a cathode catalyst layer 105 and a polymer electrolyte membrane 107 sandwiched by both catalyst layers, and each catalyst layer has a gas diffusion layer (Gas Diffusion Layer, hereinafter sometimes abbreviated to as "GDL") 101 on the outside. This constitution is referred to as a membrane electrode assembly (Membrane Electrode Assembly, hereinafter sometimes abbreviated to as "MEA"). In the fuel cell, this MEA is usually sandwiched by separators 109.

At least one of the anode catalyst layer 103 and the cathode catalyst layer 105 is a catalyst layer for a fuel cell comprising a carbon material which has a nitrogen-containing group, a metal catalyst and an ionomer. The carbon material having a nitrogen-containing group is a catalyst carrier, the metal catalyst is a catalyst component, and the ionomer is an electrolyte. In the catalyst layer, the carbon material having a nitrogen-containing group carries the metal catalyst. That is, the catalyst layer comprises a catalyst composition containing a metal catalyst, a carbon material having a nitrogen-containing group on which the metal catalyst is carried, and an ionomer.

As the carbon material in the carbon material having a nitrogen-containing group which is a catalyst carrier, there may be mentioned carbon black such as channel black, furnace black, thermal black and acetylene black, graphitized carbon black, natural graphite, artificial graphite, single layer graphene, multilayer graphene, single-walled carbon nanotube, multi-walled carbon nanotube, fullerene, diamond-like carbon, activated carbon, coke and carbon fiber, and among these, carbon black and graphitized carbon black are preferably mentioned and carbon black is more preferably mentioned from the viewpoint that the nitrogen-containing group can be easily introduced. The main function of the catalyst carrier is to conduct electrons. Further, as the main function of the catalyst carrier, there may be mentioned transportation of a fuel gas and water through the pores of the catalyst carrier.

The carbon material is not particularly limited, and from the viewpoint that the catalyst is carried well, a specific surface area is preferably 10 to 2,500 $m^2/g$, more preferably 30 to 2,000 $m^2/g$, and further preferably 50 to 1,500 $m^2/g$.

The nitrogen-containing group in the carbon material having a nitrogen-containing group which is a catalyst carrier preferably has an amino group and/or a cyano group, and more preferably has at least one kind selected from the group consisting of an imidazoline structure, an amidine structure, an amide bond and a cyano group. Moreover, from the viewpoint of activity of the catalyst, it is further preferably to have at least one kind selected from the group consisting of an amidine structure and a cyano group, and from the viewpoint of durability of the metal catalyst, it is further preferably to have at least one kind selected from the group consisting of an amidine structure and a cyano group.

As the nitrogen-containing group, there may be specifically mentioned the following substituents. The wavy line in these groups means a bonding position.

[Formula 3]

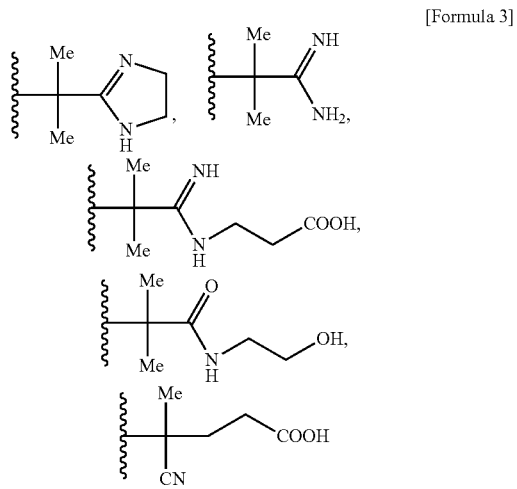

These may be used one kind alone or may be used in combination of two or more kinds.

Among these, from the viewpoint of activity of the catalyst,

[Formula 4]

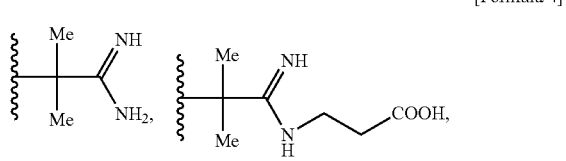

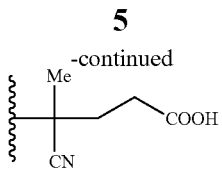

are more preferable, from the viewpoint of durability of the metal catalyst,

[Formula 5]

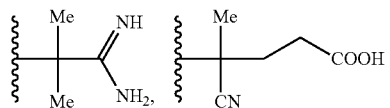

are more preferable,
from the viewpoint of a carried amount of the metal catalyst,

[Formula 6]

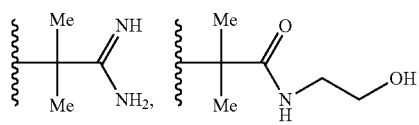

are more preferable, and
from the above-mentioned viewpoints in total,

[Formula 7]

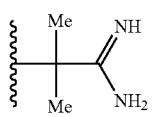

is further preferable.

The carbon material having a nitrogen-containing group can be obtained by reacting an azo compound having a nitrogen-containing group and a carbon material.

As the carbon material, the above-mentioned materials may be mentioned.

As the nitrogen-containing group in the azo compound having a nitrogen-containing group, the above-mentioned materials may be mentioned.

As the azo compound having a nitrogen-containing group, there may be specifically mentioned the following compounds.

[Formula 8]

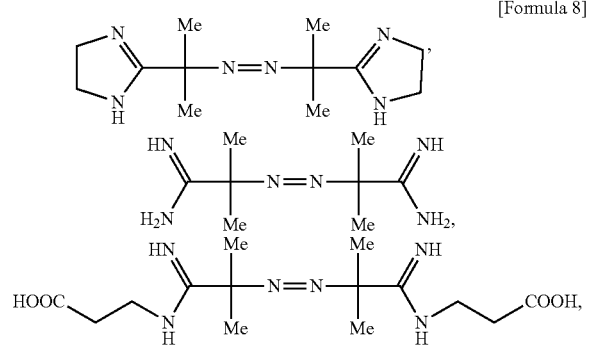

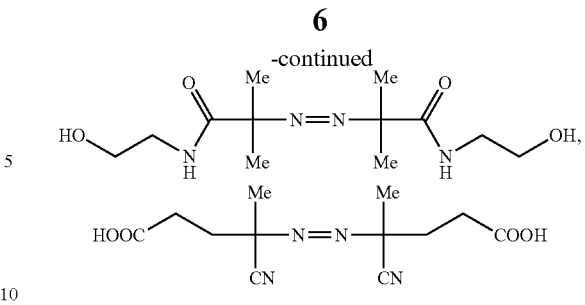

These may be used one kind alone or may be used in combination of two or more kinds.

The reaction of the azo compound having a nitrogen-containing group and the carbon material contains,
Step 1 of dispersing the carbon material in a solvent to obtain a dispersion, and
Step 2 of adding an azo compound having a nitrogen-containing group to the dispersion and heating the mixture.

In Step 1, as the solvent to disperse the carbon material, there may be mentioned, for example, water, methanol, ethanol, 1-propanol, isopropanol, chloroform, acetone, dimethylformamide, 1,4-dioxane and diethyl ether. Among these, water, methanol and ethanol are preferable.

As a heating temperature in Step 2, it is not particularly limited as long as it is a temperature at which the azo compound is decomposed into radicals, and is preferably 40 to 90° C.

As the metal catalyst, there may be mentioned platinum, an alloy of platinum and other metal(s), a platinum-containing catalyst such as a core shell in which platinum is made a shell portion; and other metal catalysts. These may be used one kind alone or in combination of two or more kinds. Among these, from the point of catalytic activity, a platinum-containing catalyst is preferable.

In the alloy of platinum and other metal(s), as a metal which constitutes an alloy with platinum, it is not particularly limited as long as it is other than platinum, and may be mentioned, for example, boron, magnesium, aluminum, silicon, calcium, scandium, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, indium, tin, antimony, barium, hafnium, tantalum, tungsten, rhenium, osmium, iridium, gold, lead, bismuth, lanthanum and cerium. These may be used a single kind alone or may be used in combination of two or more kinds.

In the core shell in which platinum is made a shell portion, the core portion comprises a metal other than platinum, and the shell portion is platinum. As the metal to be used in the core portion, it is not particularly limited as long as it is other than platinum, and may be mentioned, for example, nickel, copper, palladium, silver, gold, iridium, titanium, iron, cobalt, ruthenium, osmium, chromium, molybdenum and tungsten. These may be used a single kind alone or may be used in combination of two or more kinds.

As the catalyst, a platinum-containing catalyst is preferably used, and is not limited thereto, and there may be adopted as the catalyst such as a noble metal including gold, silver, ruthenium, rhodium, palladium, osmium and iridium, a base metal iron, nickel, manganese, cobalt, chromium, copper, zinc, molybdenum, tungsten, germanium and tin, an alloy of these noble metals and base metals, or a compound such as metal oxide and metal complex. These may be used a single kind alone or may be used in combination of two or more kinds.

A method for carrying the metal catalyst to the carbon material having a nitrogen-containing group will be explained. After adding sodium carbonate to a dispersion of the carbon material having a nitrogen-containing group and stirring, a precursor of a metal catalyst is added to the mixture, the resulting mixture is stirred while heating, if necessary, and then, a formaldehyde aqueous solution is further added thereto. Thereafter, the mixture is stirred while heating, if necessary, and filtered, and the filtrate is further dried and heated to obtain a carbon material having a nitrogen-containing group to which the metal catalyst is carried. As the precursor of the metal catalyst, there may be mentioned a metal salt and a metal complex. As the metal salt, there may be mentioned a halide such as a chloride, a sulfate, a nitrate, an ammonium salt and a carbonate.

As the ionomer which is an electrolyte, those having a sulfonic acid group is preferable, and there may be mentioned a fluorine-based sulfonic acid polymer such as Nafion (registered trademark, manufactured by DuPont Inc.), Aquivion (registered trademark, manufactured by Solvay S.A.), Flemion (registered trademark, manufactured by AGC Inc.) and Aciplex (registered trademark, manufactured by Asahi Kasei Corporation), a hydrocarbon-based sulfonic acid polymer and a partial fluorine-based introduced type hydrocarbon-based sulfonic acid polymer. These may be used one kind alone or in combination of two or more kinds. Among these, a perfluoro acid-based polymer such as Nafion (registered trademark) is preferable.

In the catalyst layer, it is considered that the nitrogen-containing group possessed by the carbon material and the substituent such as a sulfonic acid group of the ionomer are electrostatically interacting with each other, whereby it is considered that the ionomer is, by suppressing deviation of a coated amount depending on the places, coated on the carbon material having a nitrogen-containing group which carries the metal catalyst. Incidentally, in the present specification, a coating means a state in which at least a part of the surface of the object to be coated is covered.

A method for preparing the catalyst composition and the catalyst layers 103 and 105 of the present invention will be explained. The catalyst composition can be prepared by dispersing the metal catalyst-carried carbon material in which the metal catalyst is carried on the carbon material having a nitrogen-containing group, and the ionomer in a solvent. The catalyst composition is also referred to as catalyst ink. Regarding the catalyst layer, after coating the catalyst composition of the present invention on an objective substrate, the solvent is dried to obtain a catalyst layer having a catalyst composition containing the metal catalyst-carried carbon material having a nitrogen-containing group and the ionomer.

Alternatively, a solvent is added to the metal catalyst-carried carbon material, ultrasonic waves are irradiated to the mixture in an ultrasonic cleaning machine and stirring the mixture to prepare a dispersion of the metal catalyst-carried carbon, after coating it on an objective substrate and the solvent is evaporated to carry the metal catalyst-carried carbon on the substrate, subsequently, a solution containing the ionomer is coated on the substrate onto which the metal catalyst-carried carbon has been coated, and the solvent is evaporated, whereby a catalyst layer having a catalyst composition containing the metal catalyst-carried carbon material having a nitrogen-containing group and the ionomer may be obtained.

An amount of each component in the catalyst composition is not particularly limited, and the catalyst composition contains the metal catalyst, the carbon material having a nitrogen-containing group and the ionomer, and in 100% by mass of the catalyst composition, the metal catalyst is preferably 1 to 50% by mass, more preferably 5 to 35% by mass, the carbon material having a nitrogen-containing group is preferably 20 to 80% by mass, more preferably 30 to 60% by mass, and the ionomer is preferably 10 to 60% by mass, and more preferably 30 to 40% by mass.

As the objective substrate, there may be mentioned, for example, a polymer electrolyte membrane, GDL and a sheet comprising a fluorine resin, and the catalyst layer can be prepared by the conventionally know producing method. When the catalyst composition is coated on the sheet comprising the fluorine resin, the coated catalyst layer is transcribed to the solid electrolyte. As a sheet comprising the fluorine resin, a sheet comprising polytetrafluoroethylene (PTFE) is generally used.

A binder that binds the catalyst carriers to each other may be formulated to the composition of the catalyst composition. By adjusting the composition of these catalyst compositions, it is possible to improve functions and properties such as to suppress lowering in electronic conductive properties, to improve proton conductivity, to improve diffusivity of fuel gas, to improve efficiency of water transportation, and to improve mechanical strength of the catalyst layer.

As a solvent used for the catalyst composition, there may be mentioned, for example, water, methanol, ethanol, 1-propanol, 2-propanol, 1-butanol, 2-butanol, isobutyl alcohol, tert-butyl alcohol, pentanol, dimethylsulfoxide and N,N-dimethylformamide. As the solvent, water, methanol, ethanol, 1-propanol, 2-propanol, 1-butanol, 2-butanol and isobutyl alcohol are preferable. Among the above-mentioned solvents, two or more kinds may be used in admixture. From the viewpoints that reaggregation of the composition is suppressed, coating is easy, and further the solvent can be suppressed from remaining in the catalyst layer, water, ethanol and 1-propanol are more preferable as the solvent to be used in the catalyst composition.

As a material of the polymer electrolyte membrane 107, there may be mentioned carbon-based solid acids, a fluorine-based sulfonic acid polymer such as Nafion (registered trademark, manufactured by DuPont Inc.), Aquivion (registered trademark, manufactured by Solvay S.A.), Flemion (registered trademark, manufactured by AGC Inc.) and Aciplex (registered trademark, manufactured by Asahi Kasei Corporation), a hydrocarbon-based sulfonic acid polymer and a partial fluorine-based introduced type hydrocarbon-based sulfonic acid polymer. Regarding the catalyst layer, as a material of the polymer electrolyte membrane, any materials of the fluorine-based sulfonic acid polymer, the hydrocarbon-based sulfonic acid polymer and the partial fluorine-based introduced type hydrocarbon-based sulfonic acid polymer can be used as the material of the catalyst layer, and it is preferable to use the fluorine-based sulfonic acid polymer and the partial fluorine-based introduced type hydrocarbon-based sulfonic acid polymer.

As the gas diffusion layer 101, it is not particularly limited, and a porous material having conductivity is preferably used and such a material may be mentioned, for example, carbonic paper and non-woven fabric, felt, and non-woven fabric. Further, in GDL, there is a material in which a layer called a microporous layer (Micro Porous Layer, hereinafter it is abbreviated to as "MPL") which is a coating layer comprising a water-repellent resin and a carbon material as main components is coated, and it has been reported that water transport during power generation of a fuel cell can be carried out effectively, and the catalyst layer can also use a gas diffusion layer having this MPL.

As the material of the separator 109, it is not particularly limited, and may be mentioned a carbon material and a metal material such as stainless steel.

Second Embodiment of the Present Invention

The second embodiment of the present invention is a carbon material having a nitrogen-containing group, which is a carbon material having a nitrogen-containing group wherein the nitrogen-containing group is at least one kind selected from the following groups.

[Formula 9]

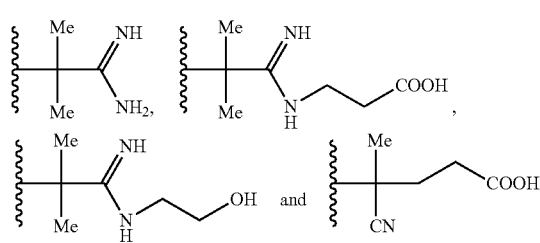

These carbon materials having a nitrogen-containing group are suitably used as a catalyst carrier in a catalyst layer of a polymer electrolyte fuel cell, in particular, as a catalyst carrier in a catalyst layer of a polymer electrolyte fuel cell using a metal catalyst as a catalyst.

Among these nitrogen-containing groups, from the viewpoint of activity of the catalyst,

[Formula 10]

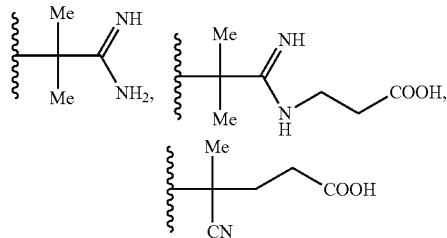

are preferable, from the viewpoint of durability,

[Formula 11]

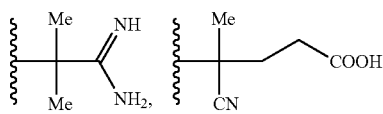

are preferable,
from the viewpoint of a carried amount of the metal catalyst,

[Formula 12]

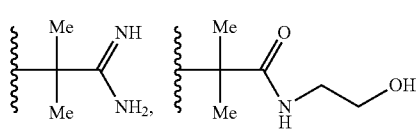

are preferable, from the above-mentioned viewpoints in total,

[Formula 13]

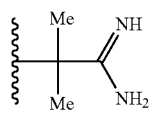

is more preferable.

The carbon material having a nitrogen-containing group can be obtained by reacting an azo compound having a nitrogen-containing group and a carbon material.

As the carbon material, there may be mentioned carbon black such as channel black, furnace black, thermal black and acetylene black, graphitized carbon black, natural graphite, artificial graphite, single layer graphene, multilayer graphene, single-walled carbon nanotube, multi-walled carbon nanotube, fullerene, diamond-like carbon, activated carbon, coke and carbon fiber, and among these, carbon black and graphitized carbon black are preferably mentioned from the viewpoint that the nitrogen-containing group can be easily introduced, and carbon black is more preferably mentioned.

The carbon material is not particularly limited, and from the viewpoint that the catalyst is carried well, a specific surface area is preferably 10 to 2,500 $m^2/g$, more preferably 30 to 2,000 $m^2/g$, and further preferably 50 to 1,500 $m^2/g$.

As the azo compound having a nitrogen-containing group, there may be specifically mentioned the following compounds.

[Formula 14]

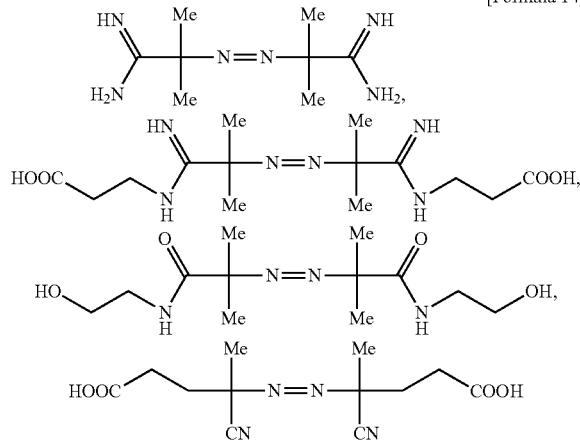

These may be used one kind alone or may be used in combination of two or more kinds.

Among these, from the viewpoint of an amount of the nitrogen-containing group introduced into the carbon materials,

[Formula 15]

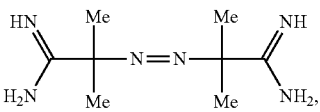

-continued

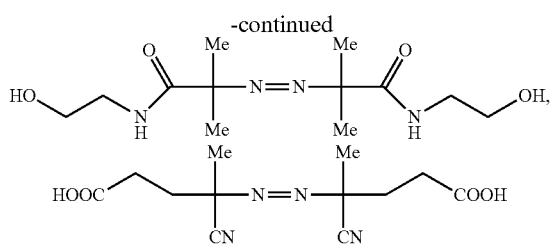

are preferable, and
from the viewpoint of catalytic activity when it is used as a catalyst carrier for the catalyst layer of the polymer electrolyte fuel cell and from the viewpoint of durability of metal catalyst,

[Formula 16]

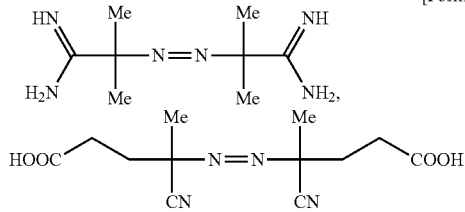

are preferable.

The reaction of the azo compound having a nitrogen-containing group and the carbon material comprises
Step 1 of dispersing the carbon material in a solvent to obtain a dispersion, and
Step 2 of adding an azo compound having a nitrogen-containing group to the dispersion and heating the mixture.

In Step 1, as the solvent to disperse the carbon material, there may be mentioned, for example, water, methanol, ethanol, 1-propanol, isopropanol, chloroform, acetone, dimethylformamide, 1,4-dioxane and diethyl ether. Among these, water, methanol and ethanol are preferable.

As a heating temperature in Step 2, it is not particularly limited as long as it is a temperature at which the azo compound is decomposed into radicals, and is preferably 40 to 90° C.

EXAMPLES

Hereinafter, the present invention will be more specifically explained by referring to Examples, but the present invention is not limited to these.
Incidentally, in Examples, to introduce a nitrogen-containing group into carbon black is also referred to as "modification", carbon black having a nitrogen-containing group is also referred to as "modified carbon", and carbon black not modified is also referred to as "carbon".
The materials used in Examples are as follows.
Carbon black: KB EC300J (manufactured by Lion Specialty Chemicals Co., Ltd.) 5% Nafion dispersion (registered trademark): (manufactured by Aldrich)

Synthetic Example 1

(Step 1)
Ion exchanged water (100 mL) was added to carbon black (1.00 g), and the mixture was stirred by an ultrasonic homogenizer to obtain a dispersion of carbon black. The dispersion was added to an aqueous solution (100 mL) of 2,2'-azobis(2-methyl-propionamidine)·dihydrochloride (5.00 g), and the mixture was stirred at 80° C. for 16 hours. After cooling to room temperature, filtration and washing were carried out, and Soxhlet extraction was carried out on the obtained filtrate using hot water for 12 hours, and then dried to obtain modified carbon 1 which is a carbon black having the following substituent.

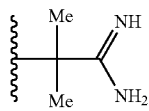

[Formula 17]

(Step 2)
Ultrapure water (50 mL) was added to modified carbon 1 (0.225 g) obtained in Step 1, the mixture was stirred by an ultrasonic homogenizer to obtain a dispersion of modified carbon 1. Sodium carbonate (0.133 g) was added to the dispersion, and ultrasonic waves were irradiated in an ultrasonic cleaning machine and stirring was carried out. An aqueous solution (50 mL) of chloroplatinic acid·hexahydrate (0.119 g) was added thereto, and the resulting mixture was stirred at 80° C. for one hour. Thereafter, a 0.073M formaldehyde aqueous solution (20 mL) was added thereto, and the mixture was stirred at 80° C. for further 4 hours. After filtration was carried out, the filtrate was dried overnight in a desiccator at room temperature, and heat treatment was carried out under nitrogen atmosphere at 120° C. for 6 hours to obtain an objective platinum-carrying modified carbon 1.

Synthetic Example 2

(Step 1)
Ion exchanged water (100 mL) was added to carbon black (1.00 g), and the mixture was stirred by an ultrasonic homogenizer to obtain a dispersion of carbon black. The dispersion was added to an aqueous solution (100 mL) of 2,2'-azobis[N-(2-carboxyethyl)-2-methylpropionamidine].n hydrate (5.00 g), and the mixture was stirred at 80° C. for 16 hours. After cooling to room temperature, filtration and washing were carried out, and Soxhlet extraction was carried out on the obtained filtrate using hot water for 12 hours, and then dried to obtain modified carbon 2 which is a carbon black having the following substituent.

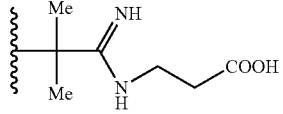

[Formula 18]

(Step 2)
Ultrapure water (50 mL) was added to modified carbon 2 (0.225 g) obtained in Step 1, the mixture was stirred by an ultrasonic homogenizer to obtain a dispersion of modified carbon 2. Sodium carbonate (0.133 g) was added to the dispersion, and ultrasonic waves were irradiated in an ultrasonic cleaning machine and stirring was carried out. An aqueous solution (50 mL) of chloroplatinic acid hexahydrate (0.119 g) was added thereto, and the resulting mixture was stirred at 80° C. for one hour. Thereafter, a 0.073M formaldehyde aqueous solution (20 mL) was added thereto, and the mixture was stirred at 80° C. for further 4 hours. After filtration was carried out, the filtrate was dried overnight in a desiccator at room temperature, and heat treatment was carried out under nitrogen atmosphere at 120° C. for 6 hours to obtain an objective platinum-carrying modified carbon 2.

Synthetic Example 3

(Step 1)

Ion exchanged water (100 mL) was added to carbon black (1.00 g), and the mixture was stirred by an ultrasonic homogenizer to obtain a dispersion of carbon black. The dispersion was added to an aqueous solution (100 mL) of 2,2'-azobis[2-methyl-N-(2-hydroxyethyl)propionamide] (5.00 g), and the mixture was stirred at 80° C. for 16 hours. After cooling to room temperature, filtration and washing were carried out, and Soxhlet extraction was carried out on the obtained filtrate using hot water for 12 hours, and then dried to obtain modified carbon 3 which is a carbon black having the following substituent.

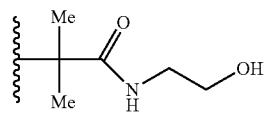

[Formula 19]

(Step 2)

Ultrapure water (50 mL) was added to modified carbon 3 (0.225 g) obtained in Step 1, and the mixture was stirred by an ultrasonic homogenizer to obtain a dispersion of modified carbon 3. Sodium carbonate (0.133 g) was added to the dispersion, and ultrasonic waves were irradiated in an ultrasonic cleaning machine and stirring was carried out. An aqueous solution (50 mL) of chloroplatinic acid hexahydrate (0.119 g) was added thereto, and the resulting mixture was stirred at 80° C. for one hour. Thereafter, a 0.073M formaldehyde aqueous solution (20 mL) was added thereto, and the mixture was stirred at 80° C. for further 4 hours. After filtration was carried out, the filtrate was dried overnight in a desiccator at room temperature, and heat treatment was carried out under nitrogen atmosphere at 120° C. for 6 hours to obtain an objective platinum-carrying modified carbon 3.

Synthetic Example 4

(Step 1)

Ion exchanged water (100 mL) was added to carbon black (1.00 g), and the mixture was stirred by an ultrasonic homogenizer to obtain a dispersion of carbon black. The dispersion was added to an aqueous solution (100 mL) of 4,4'-azobis(4-cyano-valeric acid (5.00 g), and the mixture was stirred at 80° C. for 16 hours. After cooling to room temperature, filtration and washing were carried out, and Soxhlet extraction was carried out on the obtained filtrate using hot water for 12 hours, and then dried to obtain modified carbon 4 which is a carbon black having the following substituent.

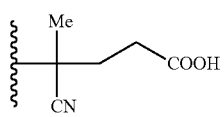

[Formula 20]

(Step 2)

Ultrapure water (50 mL) was added to modified carbon 4 (0.225 g) obtained in Step 1, and the mixture was stirred by an ultrasonic homogenizer to obtain a dispersion of modified carbon 4. Sodium carbonate (0.133 g) was added to the dispersion, and ultrasonic waves were irradiated in an ultrasonic cleaning machine and stirring was carried out. An aqueous solution (50 mL) of chloroplatinic acid hexahydrate (0.119 g) was added thereto, and the resulting mixture was stirred at 80° C. for one hour. Thereafter, a 0.073M formaldehyde aqueous solution (20 mL) was added thereto, and the resulting mixture was stirred at 80° C. for further 4 hours. After filtration was carried out, the filtrate was dried overnight in a desiccator at room temperature, and heat treatment was carried out under nitrogen atmosphere at 120° C. for 6 hours to obtain an objective platinum-carrying modified carbon 4.

Comparative Synthetic Example 1

Ultrapure water (50 mL) was added to carbon black (0.225 g), and the mixture was stirred by an ultrasonic homogenizer to obtain a dispersion of carbon black. Sodium carbonate (0.133 g) was added to the dispersion, and ultrasonic waves were irradiated in an ultrasonic cleaning machine and stirring was carried out. An aqueous solution (50 mL) of chloroplatinic acid hexahydrate (0.119 g) was added thereto, and the mixture was stirred at 80° C. for one hour. Thereafter, a 0.073M formaldehyde aqueous solution (20 mL) was added thereto, and the mixture was stirred at 80° C. for further 4 hours. After filtration was carried out, the filtrate was dried overnight in a desiccator at room temperature, and heat treatment was carried out under nitrogen atmosphere at 120° C. for 6 hours to obtain an objective platinum-carrying carbon.

<Evaluation of Modified Carbon on which Platinum Carried>

(1) Introduced Amount of Nitrogen-Containing Group into Carbon Black

TG-DTA measurement was carried out to measure an introduced amount of the nitrogen-containing group into the modified carbons of Synthetic Examples 1 to 4, and an amount of decrease at 200° C. to 500° C. was obtained as an introduced amount of the nitrogen-containing group.

(2) Introduced Amount of Nitrogen into Carbon Black

Elemental analysis was carried out to measure an introduced amount of nitrogen into the modified carbons of Synthetic Examples 1 to 4.

(3) Carried Rate of Platinum

In order to measure the platinum carried rate of the modified carbon on which platinum is carried and the carbon on which platinum is carried obtained in Synthetic Examples 1 to 4 and Comparative Synthetic Example 1, a solution in which platinum in the catalyst was dissolved using hot aqua regia was prepared. The platinum carried rate was obtained from the solution by ICP emission spectrometry (device name: 700Series ICP-OES manufactured by Agilent Technologies).

(4) Particle Size of Platinum

In Synthetic Examples 1 to 4 and Comparative Synthetic Example 1, measurement of the particle size of platinum carried on the modified carbon and carbon was carried out and obtained by the CO pulse method calculated from an adsorbed amount of CO on the metal surface.

In Table 1, the above evaluations of Synthetic Examples 1 to 4 and Comparative Synthetic Example 1 are shown with a list.

TABLE 1

| | Modified carbon | | Platinum catalyst | |
|---|---|---|---|---|
| | Nitrogen-containing group introduced amount (% by mass) | Nitrogen introduced amount (% by mass) | Platinum carried rate (% by mass) | Platinum particle size (nm) |
| Synthetic Example 1 | 12.8 | 2.27 | 13.0 | 2.1 |
| Synthetic Example 2 | 9.11 | 1.45 | 12.7 | 2.4 |
| Synthetic Example 3 | 13.8 | 1.38 | 13.6 | 2.2 |
| Synthetic Example 4 | 13.4 | 1.57 | 12.3 | 2.4 |
| Comparative Synthetic Example 1 | — | — | 12.6 | 1.7 |

The nitrogen-containing group was introduced into carbon in either of Synthetic Examples 1 to 4, and platinum was carried on either of the modified carbon of Synthetic Example 1 to 4 and the carbon of Comparative Synthetic Example 1.

<Evaluation of Catalyst Layer>

In order to measure the activity of the catalyst, a working electrode having the same constitution as the catalyst layer was prepared, and the electrochemical surface area (ECA) and oxidation-reduction current were measured.

(1) Preparation of Working Electrode
(1-1) Preparation of Working Electrode I

Example 1

Water and ethanol were added to the modified carbon 1 on which platinum was carried prepared in Synthetic Example 1, and ultrasonic waves were irradiated inside the ultrasonic cleaning machine and the mixture was stirred to prepare a dispersion of modified carbon on which platinum was carried. On the other hand, a solution in which a 5% by mass Nafion (registered trademark) solution was diluted with 2-propanol was also prepared. Onto a glassy carbon disk, a dispersion of the modified carbon 1 on which platinum was carried so that the platinum catalyst amount became 1.5 μg was coated, and the solvent was evaporated to carry the modified carbon 1 on which platinum was carried onto the glassy carbon disk. Subsequently, the Nafion (registered trademark) solution prepared previously was coated on the glassy carbon disk on which the modified carbon 1 on which platinum had been carried was carried so that the mass of Nafion became 0.5-fold to the mass of carbon in the carbon on which platinum was carried, and the solvent was evaporated to prepare a working electrode I having a composition containing the modified carbon 1 on which platinum was carried and Nafion.

Examples 2 to 4

In the same manner as in Example 1, a working electrode I was prepared except for using the modified carbons 2 to 4 on which platinum was carried prepared in Synthetic Examples 2 to 4 in place of the modified carbon 1 on which platinum was carried prepared in Synthetic Example 1.

Comparative Example 1

In the same manner as in Example 1, a working electrode I was prepared except for using the carbon on which platinum was carried prepared in Comparative Synthetic Example 1 in place of the modified carbon 1 on which platinum was carried prepared in Synthetic Example 1.

(1-2) Preparation of Working Electrode II

Example 5

Water and ethanol were added to the modified carbon 1 on which platinum was carried prepared in Synthetic Example 1 and a 5% by mass Nafion solution was further added so that the mass of Nafion became 0.5-fold to the mass of carbon in the carbon on which platinum was carried, and ultrasonic waves were irradiated inside the ultrasonic cleaning machine and the mixture was stirred to prepare a dispersion containing the modified carbon 1 on which platinum was carried and Nafion. Onto a glassy carbon disk, the previous dispersions were each coated so that the platinum catalyst amount became 1.5 μg, and the solvent was evaporated to prepare a working electrode II containing a composition which contains the modified carbon 1 on which platinum was carried and Nafion.

Comparative Example 2

In the same manner as in Example 5, a working electrode II was prepared except for using the carbon on which platinum was carried prepared in Comparative Synthetic Example 1 in place of the modified carbon 1 on which platinum was carried prepared in Synthetic Example 1.

(2) Measurement of Electrochemical Surface Area (ECA) and Measurement of Oxidation-Reduction Current of Catalyst and Calculation of Specific Activity and Mass Activity of Catalyst Layer Measurement of the electrochemical surface area and measurement of the oxidation-reduction current of the catalyst were carried out using a rotating disk electrode, based on the ORR activity evaluation method (2011 version) recommended by Fuel Cell Commercialization Conference of Japan (FCCJ).

As working electrodes, the working electrodes I of Examples 1 to 4 and Comparative Example 1 and the working electrodes II of Example 5 and Comparative Example 2 were used, respectively, and a reversible hydrogen electrode was used as a reference electrode and a platinum mesh was used as a counter electrode. 0.1 M perchloric acid was used as the electrolyte solution, and a temperature of the electrolyte solution at the time of measurement was made 25° C. In an electrolytic cell in which oxygen was expelled by bubbling nitrogen, cyclic voltammetry in which scanning is carried out in the range of 0.05 to 1.2 V (the value of the potential is expressed with the reversible hydrogen electrode as a standard, hereinafter the same) with a speed of 100 mV/sec in the state that the rotation number of the electrode was made 0 was carried out, cleaning of the catalyst surface and measurement of ECA were carried out and the ECA on the absorption side was obtained. The ECA in Table 2 and Table 3 is the value of the obtained ECA per unit mass of platinum.

Subsequently, oxygen was bubbled and dissolved until the oxygen was saturated in the electrolyte solution, and the rotating electrode was rotated at 400, 625, 900, 1,225 and 1,600 rpm to carry out hydrodynamic voltammetry and an oxygen reduction current was measured. The scanning was carried out with a scanning speed of 10 mV/sec from 0.05 V to 1.0 V, the value of the oxygen reduction current at 0.9 V was recorded, the value of the recorded oxygen reduction current was corrected using the Koutecky-Levich equation, and the corrected value was divided by the value of the ECA on the absorption side obtained as mentioned above to calculate the oxygen reduction activity (specific activity) of the catalyst. The mass activity was obtained similarly by dividing the value of the corrected oxygen reduction current by the mass of platinum. A temperature of the electrolyte solution at the time of measurement of the activity was made 25° C.

The results of the working electrode I are shown in Table 2, and the results of the working electrode II are shown in Table 3.

TABLE 2

|  | ECA ($m^2 g^{-1}$) | Specific activity ($mA\ cm^{-2}$) | Mass activity ($Ag^{-1}$) |
| --- | --- | --- | --- |
| Example 1 | 118 | 0.466 | 550 |
| Example 2 | 103 | 0.437 | 450 |
| Example 3 | 100 | 0.302 | 302 |
| Example 4 | 110 | 0.444 | 488 |
| Comparative Example 1 | 151 | 0.145 | 219 |

Examples 1 to 4 were excellent than Comparative Example 1 in both of the specific activity and the mass activity. Among these, Example 1 showed the highest catalytic activity.

TABLE 3

|  | ECA ($m^2 g^{-1}$) | Specific activity ($mA\ cm^{-2}$) | Mass activity ($Ag^{-1}$) |
| --- | --- | --- | --- |
| Example 5 | 124 | 0.492 | 608 |
| Comparative Example 2 | 136 | 0.273 | 367 |

Example 5 was excellent than Comparative Example 2 in both of the specific activity and the mass activity.

(3) Measurement of Durability of Platinum Catalyst

Measurement of durability of the platinum catalyst was carried out based on a 0.6 V-1.0 V potential pulse test method (2011 version), which is a load fluctuation test condition recommended by Fuel Cell Commercialization Conference of Japan (FCCJ).

As working electrodes, the working electrodes I of Examples 1 to 4 and Comparative Example 1 were used, respectively, and a reversible hydrogen electrode was used as a reference electrode and a platinum mesh was used as a counter electrode. 0.1 M perchloric acid was used as the electrolyte solution, and a temperature of the electrolyte solution at the time of measurement was made 25° C. In an electrolytic cell in which oxygen was expelled by bubbling nitrogen, cyclic voltammetry in which scanning is carried out in the range of 0.05 to 1.2 V (hereinafter, the value of the potential is expressed with the reversible hydrogen electrode as a standard) with a speed of 100 mV/sec was carried out, and cleaning of the catalyst surface and measurement of ECA (ECA at 0 pulse) were carried out.

Subsequently, a potential pulse test of 0.6 V (3 sec)-1.0 V (3 sec) was carried out, and cyclic voltammetry measurement was carried out after 10,000 pulses to calculate the ECA and durability was evaluated by the relative change in ECA relative to the pulse of 0.

The results are shown in Table 4.

TABLE 4

|  | Relative change (%) in ECA after 10,000 pulses |
| --- | --- |
| Example 1 | 77 |
| Example 2 | 69 |
| Example 3 | 59 |
| Example 4 | 75 |
| Comparative Example 1 | 58 |

Examples 1, 2 and 4 have higher ECA maintenance rate than the carbon black into which no nitrogen-containing group is introduced, so that it can be understood that durability of platinum is excellent.

UTILIZABILITY IN INDUSTRY

The catalyst composition of the present invention can be suitably used for a catalyst layer of a polymer electrolyte fuel cell.

EXPLANATION OF REFERENCE NUMERALS

100 Polymer electrolyte fuel cell
101 Gas diffusion layer
103 Anode catalyst layer
105 Cathode catalyst layer
107 Polymer electrolyte membrane
109 Separator

The invention claimed is:
1. A catalyst composition which comprises
a metal catalyst,
a carbon material having a nitrogen-containing group on which the metal catalyst is carried, and
an ionomer,
wherein the nitrogen-containing group is at least one kind selected from the following groups:

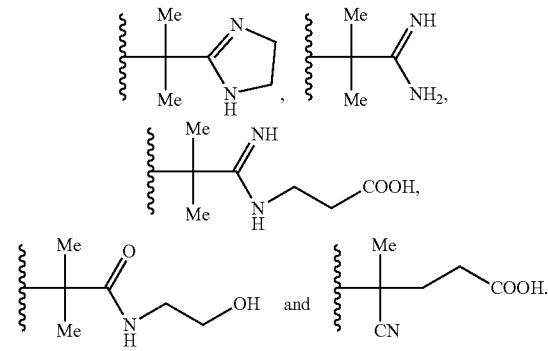

2. The catalyst composition according to claim 1, wherein the nitrogen-containing group contains at least one kind selected from the group consisting of an imidazoline structure, an amidine structure, an amide bond and a cyano group.
3. The catalyst composition according to claim 1, wherein the carbon material is at least one kind selected from the group consisting of carbon black, graphitized carbon black, natural graphite, artificial graphite, single layer graphene, multilayer graphene, single-walled carbon nanotube, multi-walled carbon nanotube, fullerene, diamond-like carbon, activated carbon, coke and carbon fiber.
4. The catalyst composition according to claim 1, wherein the ionomer has a sulfonic acid group.

5. A method for using the catalyst composition according to of claim 1 to prepare a catalyst layer of a solid polymer fuel cell, comprising coating the catalyst composition on a substrate and drying a solvent to form said catalyst layer of said polymer fuel cell.

6. A catalyst composition which comprises
a metal catalyst,
a carbon material having a nitrogen-containing group on which the metal catalyst is carried, and
an ionomer,
wherein the carbon material having a nitrogen-containing group is obtained by reacting the carbon material and an azo compound having a nitrogen-containing group.

7. A catalyst layer for a polymer electrolyte fuel cell, which comprises the catalyst composition according to claim 1 or 6.

8. A membrane electrode assembly, which comprises a polymer electrolyte membrane, a gas diffusion layer and the catalyst layer for a polymer electrolyte fuel cell according to claim 7.

9. A polymer electrolyte fuel cell, which comprises the membrane electrode assembly according to claim 8.

10. A carbon material having a nitrogen-containing group, wherein the nitrogen-containing group is at least one kind selected from the following groups

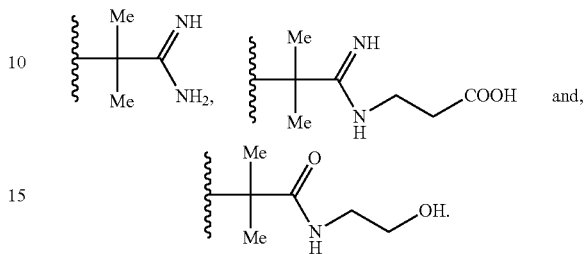

* * * * *